(12) United States Patent
Kittow et al.

(10) Patent No.: US 10,238,139 B2
(45) Date of Patent: Mar. 26, 2019

(54) TOFU PRESS AND METHOD OF REMOVING LIQUID FROM TOFU

(71) Applicants: Adam Kittow, Amersham (GB); Susanna Andrews, Amersham (GB)

(72) Inventors: Adam Kittow, Amersham (GB); Susanna Andrews, Amersham (GB)

( * ) Notice: Subject to any disclaimer, the term of this patent is extended or adjusted under 35 U.S.C. 154(b) by 343 days.

(21) Appl. No.: 15/147,520

(22) Filed: May 5, 2016

(65) Prior Publication Data

US 2017/0318856 A1 Nov. 9, 2017

(51) Int. Cl.
*A23P 30/10* (2016.01)
*B30B 9/06* (2006.01)
*A23L 11/00* (2016.01)
*A23C 20/02* (2006.01)

(52) U.S. Cl.
CPC ............ *A23P 30/10* (2016.08); *A23C 20/025* (2013.01); *A23L 11/05* (2016.08); *A23L 11/07* (2016.08); *B30B 9/06* (2013.01); *A23V 2002/00* (2013.01)

(58) Field of Classification Search
CPC ..... Y10T 29/49826; B30B 9/06; B30B 9/262; B30B 9/04; B30B 1/10; B30B 9/047; B30B 9/3032
See application file for complete search history.

(56) References Cited

U.S. PATENT DOCUMENTS

| | | | |
|---|---|---|---|
| 2,362,154 A | 11/1944 | Patrick | |
| 3,043,616 A * | 7/1962 | Magnuson | E05C 19/14 292/128 |
| 5,701,810 A | 12/1997 | Nakai | |
| 5,752,434 A | 5/1998 | Kuan | |

FOREIGN PATENT DOCUMENTS

| | | |
|---|---|---|
| GB | 175941 A | 2/1922 |
| GB | 2526329 A | 11/2015 |
| JP | H0537087 U | 10/1991 |
| JP | 2003093247 A * | 4/2003 |
| WO | 8602085 | 5/1986 |

OTHER PUBLICATIONS

Yoshie Sato, JP2003093247A, English Translation, Apr. 2003 (Year: 2003).*

* cited by examiner

*Primary Examiner* — Hong T Yoo
(74) *Attorney, Agent, or Firm* — Crose Law LLC; Bradley D. Crose

(57) ABSTRACT

Tofu is typically sold saturated in liquid, and in order for the tofu to take on a desired flavour, the liquid content of the tofu must first be reduced. The present invention provides a method of reducing the liquid content of tofu and a tofu press 10, comprising: a tray 20 for receiving tofu 30 therein; a pressure member 80 for applying pressure to the tofu 30 within the tray 20; and a toggle latch 120 releasably coupleable between the tray 20 and the pressure member 80 such that pressure is applied to the tofu 30 within the tray by the pressure member 80.

12 Claims, 4 Drawing Sheets

TOFU PRESS AND METHOD OF REMOVING LIQUID FROM TOFU

FIELD OF THE INVENTION

The present invention relates generally to a tofu press and method of removing liquid from tofu.

BACKGROUND OF THE INVENTION

Tofu is made by coagulating soy milk, separating the resultant bean curd from the whey and compressing the bean curds to form a solid mass, usually in the form of a block, known commercially by the name 'tofu'. Tofu is shipped and sold world-wide. In order for the tofu to remain edible, it is typically packaged in sealed containers, often saturated in water, the whey and/or other liquid. Tofu is highly desirable due to its delicate flavour and its ability to absorb other flavours, thereby allowing tofu to be used as a protein substitute in a variety of dishes. One way to infuse tofu with flavour is to marinade it in a liquid of the desired flavour, and allow the marinade to diffuse into the tofu. An alternative method would be to remove a portion of the 'neutral' liquid present in the tofu, and replace it with a flavoursome liquid. In this way, waste of the flavoursome liquid can be minimised; however, it may be appreciated that a user may have difficulty first removing the neutral liquid from the tofu. In addition, reducing the liquid content of the tofu has the advantageous effect of making the tofu firmer and/or less jelly-like, which is a better consistency for cooking. Known bean curd presses fail to be portable, easy and convenient to use, and in particular often include complex moving parts that require relatively frequent maintenance. The present invention seeks to overcome these problems.

BRIEF SUMMARY OF THE INVENTION

According to a first aspect of the present invention, there is provided a tofu press, comprising: a tray for receiving tofu therein; a pressure member for applying pressure to the tofu within the tray; and a toggle latch releasably coupleable between the tray and the pressure member such that pressure is applied to the tofu within the tray by the pressure member.

In this way, coupling of the toggle latch between the tray and the pressure member causes pressure to be exerted on the tofu within the tray, by virtue of the pressure member.

The toggle latch may comprise: an arm, pivotally connected to at least one of the tray and the pressure member; a latch member, connected to the other of the at least one of the tray and the pressure member; and/or a linkage, connected to the arm and releasably connectable to the latch member to allow coupling of the tray and the pressure member.

The toggle latch may be configured such that: with the arm in a first position, the linkage is releasably connectable to the latch member; and/or rotational movement of the arm from the first position to a second position causes a tension in the linkage such that release from the latch member is prohibited.

In this way, the tension in the linkage urges the pressure member and the tray toward each other, thereby applying pressure to the tofu within the tray.

The toggle latch may be further configured such that rotational movement of the arm from the second position to a third position between the first and second positions causes the tension in the linkage to increase such that the linkage substantially maintains the arm in the second position.

That is to say, once the linkage is connected to the latch member, rotational movement of the arm from the first position to the third position gradually increases tension in the linkage, and rotational movement of the arm from the third position to the second position gradually decreases tension in the linkage. In some embodiments the tension in the linkage in the second position is within 20%, 10% and/or 5% of the tension in the linkage in the third position. In some embodiments the tension in the linkage in the first position (when connected to the latch member) is less than 20%, 10% and/or 5% of the tension in the linkage in the third position.

The linkage may comprise an elastic material. In this way, the linkage may stretch. This may allow a gradual and/or smooth increase in pressure to the tofu within the tray. In particular, the linkage may substantially follow Hooke's Law, for instance over extensions experienced within normal operation of the tofu press. The elastic material may be silicone, rubber, synthetic rubber and/or any other form of elastic material.

Alternatively, the linkage may comprise a substantially inelastic material, such as metal and/or a plastics material, as in conventional toggle latches.

In some embodiments, the linkage may be extensible. For instance, a dimension of the linkage may be predetermined by a user. In some embodiments, the linkage may be exchangeable, such that linkages of various different dimensions may be used, as selected by a user.

The linkage may pivotally connect to the arm. Alternatively, the linkage may be fixedly connected to the arm.

The linkage may be substantially flexible. In this way, relative movement of a part of the linkage spaced from the arm, with respect to the arm, may be achieved via deformation of the linkage, at least.

The arm may be a class 2 lever. That is, effort is applied on one side of a resistance and the fulcrum is located on the other side. For instance, the arm may have a first end that is pivotally attached to the tray and/or pressure member, a second end opposing the first end that is configured for manipulation by a user, and an intermediate portion between the first and second ends to which the linkage is connected. Alternatively, the arm may be a class 1 or class 3 lever.

The arm may have a substantially L-shape profile. For instance, a first end of the L may be pivotally attached to the tray and/or pressure member, a second end of the L may be configured for manipulation by a user, and the linkage may be connected to the angle/joint of the L.

The tofu press may comprise a plurality of latch members selectable for the releasable connection of the linkage thereto. In this way, an amount of pressure to be applied to tofu within the tray can be selected by a user. The latch members may be a strike, catch plate, hook and/or any other means for allowing the linkage to releasably connect thereto.

The tofu press may comprise a plurality of toggle latches. In this way, an even pressure may be applied to the tofu within the tray. In particular, the toggle latches may be spaced around a perimeter of the tofu press, for instance, evenly spaced.

The pressure member may be a pressure plate. The pressure member may comprise an exterior profile that corresponds to an interior profile of the tray. In this way, pressure may be applied uniformly across tofu within the tray. Additionally, convenient storage of the tofu press may be permitted by a compact size.

The tray may have a surface configured to permit passage of liquid therethrough. For instance, the tray may comprise a mesh, net, hole, array of holes, and or any other liquid permeable surface. The liquid permeable surface may be configured to permit passage of water and/or soy whey therethrough, and may be further configured to substantially prevent passage of tofu therethrough. Alternatively, or additionally, the pressure member may have a surface for permitting passage of liquid therethrough.

The tray may comprise an inner tray comprising the surface configured to permit passage of liquid therethrough, and an outer tray for collecting liquid having passed through the surface of the inner tray.

The inner tray may comprise legs for spacing an exterior of the inner tray from an interior of the outer tray, thereby allowing the inner tray to be spaced from liquid having passed through the surface of the inner tray into the outer tray. Alternatively, or additionally, the outer tray may comprise protuberances on an inner surface thereof, for a similar purpose.

The toggle latch may be releasably connectable between the pressure member and the inner and/or outer tray. In this way, the tofu press may be used without the need for the outer tray, it may be used with the outer tray spaced below the inner tray to allow observation of liquid passing out of the inner tray, and/or it may be used such that the outer tray cannot be removed from the inner tray. This may improve functionality, prevent accidental spillage and/or improve effective storage when not in use.

The tofu press may comprise an opaque and/or a transparent material. The tofu press may comprise glass, metal and/or a plastics material.

According to a second aspect of the present invention, there is provided a method of producing tofu, comprising the steps of: providing a tofu press according to any preceding claim; placing tofu within the tray; placing the pressure member on the tofu within the tray; coupling the toggle latch between the tray and the pressure member such that pressure is applied to the tofu within the tray by the pressure member; removing liquid from the tray; and removing tofu from the tray, the tofu having a reduced liquid content in response to the pressure applied by the pressure member.

Other foodstuffs may be pressed within the tofu press to achieve similar and/or substantially different results.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

Figure 1:
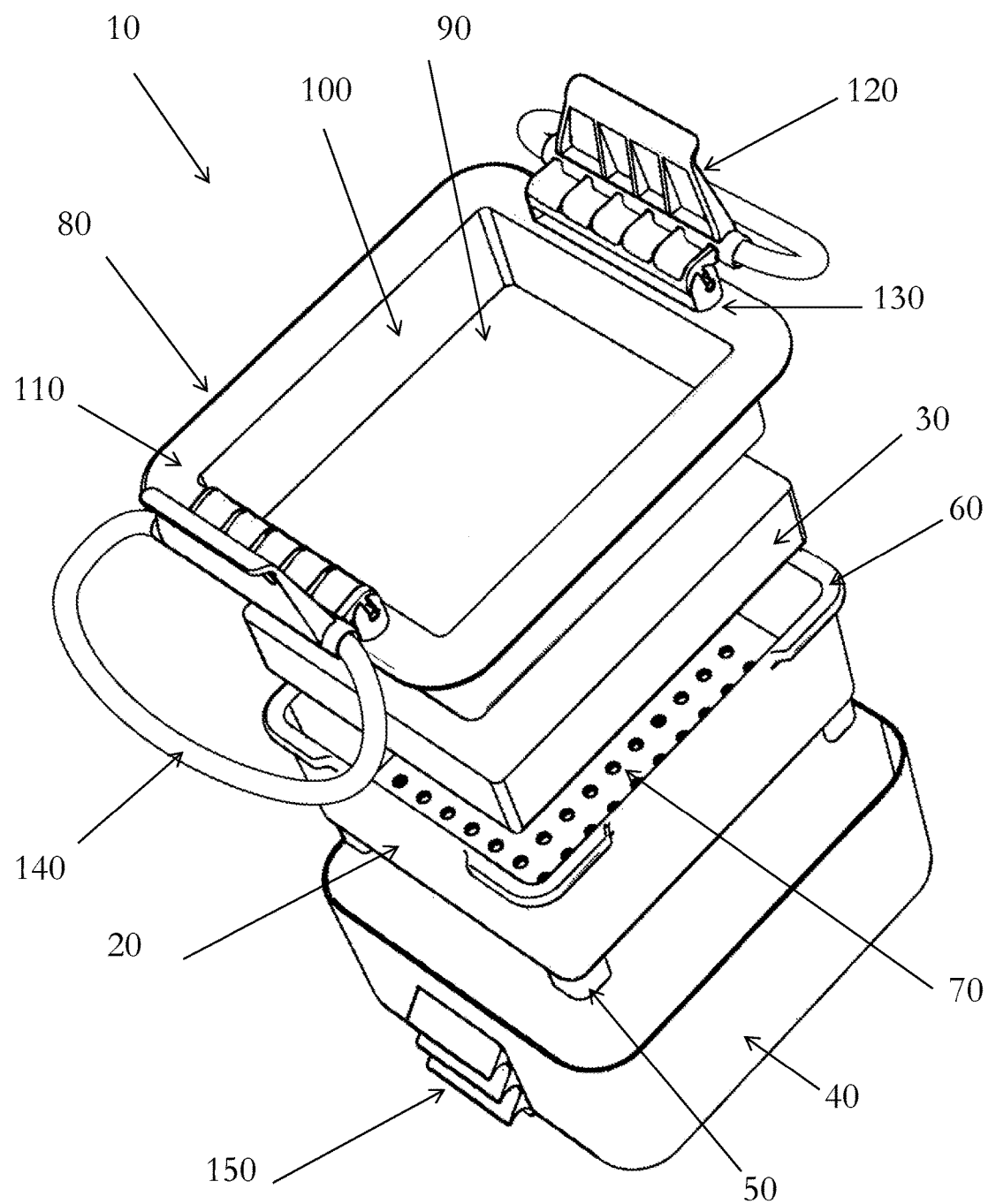
FIG. 1 is an exploded perspective view of a tofu press.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is an exploded perspective view of a tofu press 10. The tofu press 10 comprises an inner tray 20 for receiving tofu 30 therein, and an outer tray 40 for receiving the inner tray 20 therein. Both the inner tray and the outer tray are substantially cuboidal in form. The inner tray 20 has an exterior profile smaller than the interior profile of the outer tray 40, and includes four legs 50, for raising the inner tray from the bottom of the outer tray 40, and four side projections 60 for spacing the inner tray 20 from the interior sides of the outer tray 40. The inner tray 20 also includes an array of holes 70 in a lower surface thereof to allow passage of liquid from the interior of the inner tray 20 to the outer tray 40.

The tofu press 10 also comprises a pressure member 80 having a pressure plate 90 and side walls 100 that form an exterior profile that corresponds to an interior profile of the inner tray 20. Attached to an upper end of the side walls 100 is a lip 110 that prevents over-insertion of the pressure member 80 into the inner tray 20 or the outer tray 40.

Located on the lip 110 are two L-shape arms 120, pivotally connected to the lip via mounting brackets 130 at a respective end of each arm 120. The arms 120 are located on opposing sides of the tofu press 10. At an opposing end of each arm 120 to the mounting brackets 130 are grips for a user to rotate the arms 120. Passing through a central hole in each arm 120 is an elastic band member 140, which is configured and arranged to be hooked onto a selected one of three catch plates 150, as will be described with reference to the following figures. The elastic band members are shown with a circular cross section; however flat-, rectangular- and/or ribbon-shape cross-sections are also envisaged, amongst others.

Figure 2:
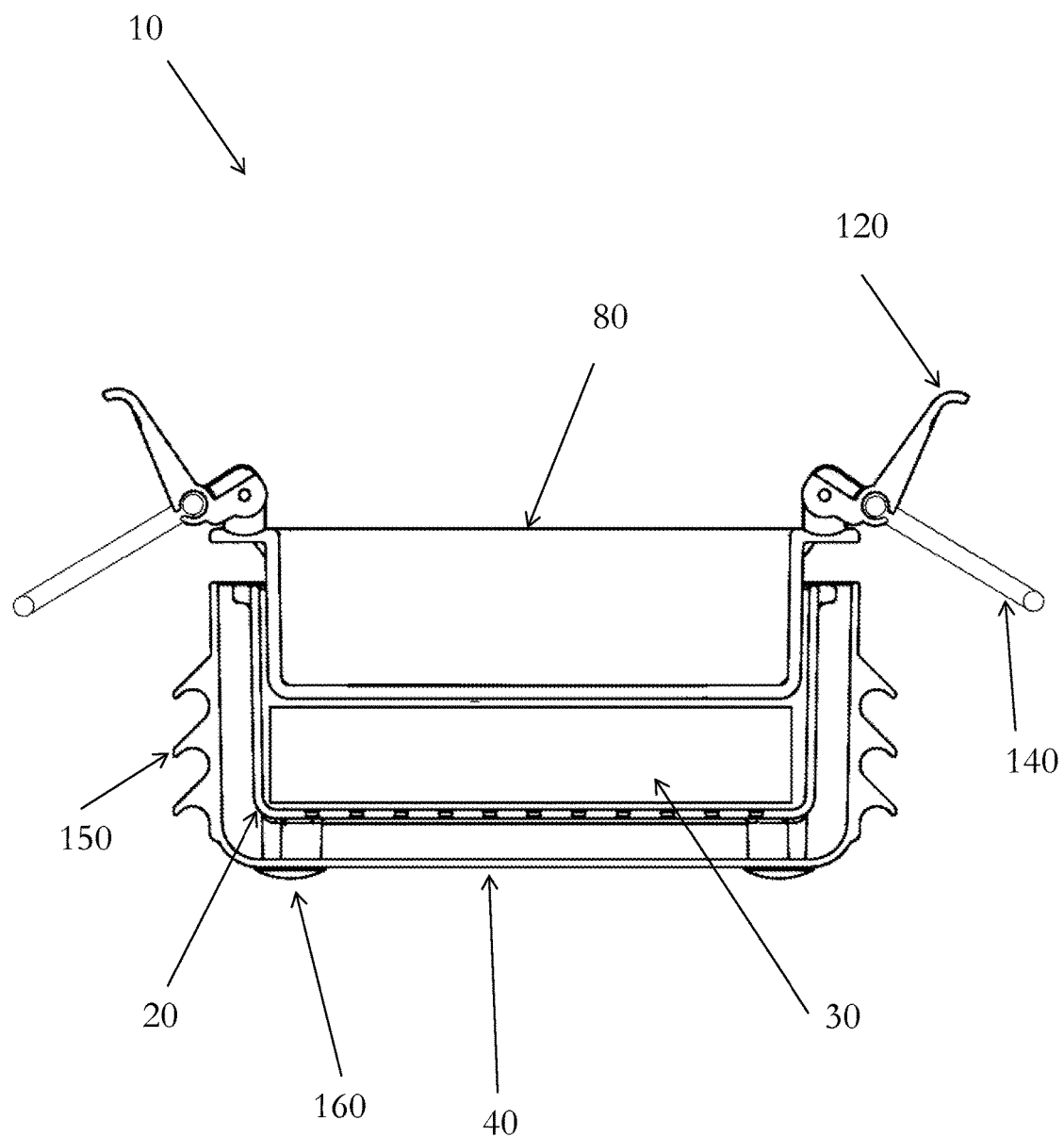
FIG. 2 is a cross-sectional view of the tofu press of FIG. 1, with the toggle latches uncoupled.

FIG. 2 is a cross-sectional view of the tofu press 10, with the arms 120 in a first rotational position. In this rotational position, the elastic band members 140 may be hooked onto a selective one of the catch plates 150. Feet 160 can be seen on the underside of the outer tray 40, to prevent the outer tray 40 from slipping on a work surface when in use. In this arrangement, four feet 160 are present, each at a respective corner of the outer tray 40.

Figure 3:
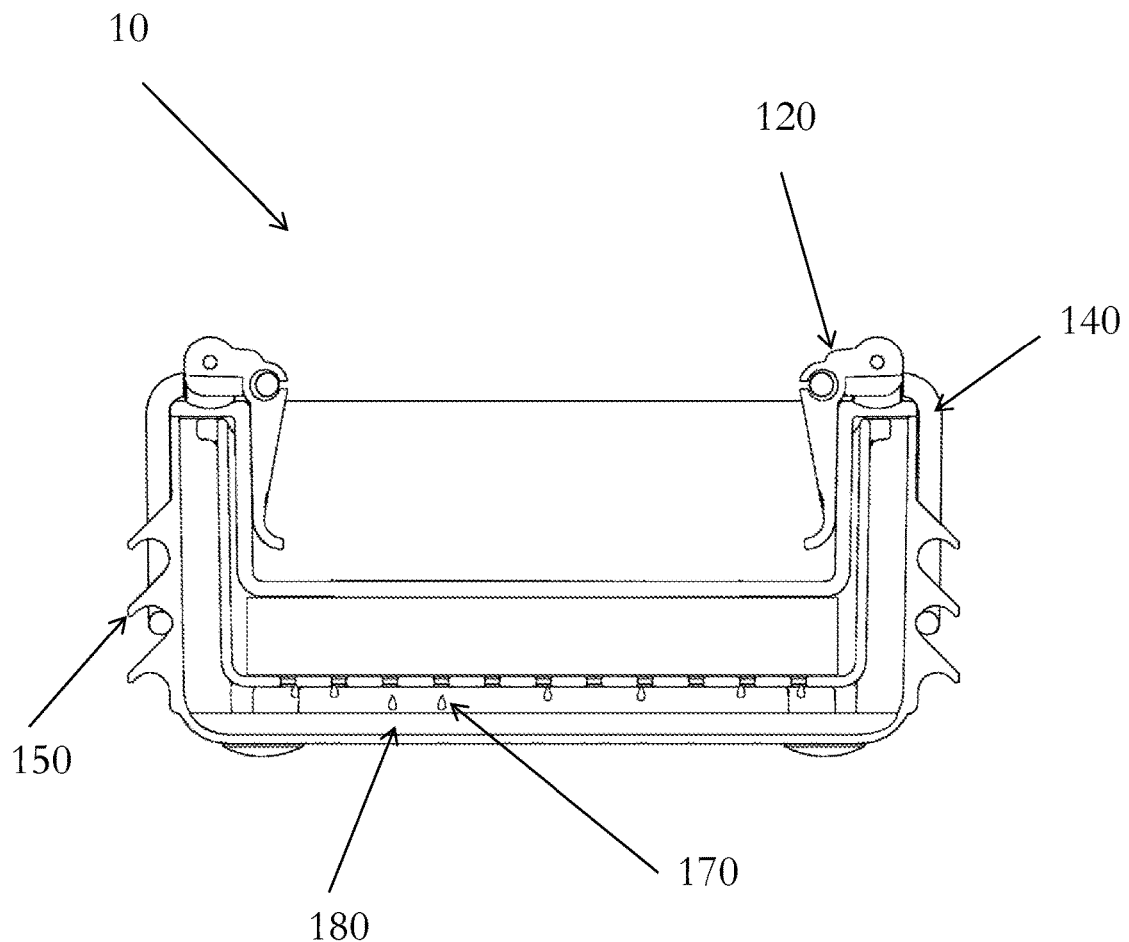
FIG. 3 is a cross-sectional view of the tofu press of FIGS. 1 and 2, with the toggle latches coupled.

FIG. 3 is a cross-sectional view of the tofu press 10, after the elastic band members 140 have been coupled to the respective middle catch plate 150 in each series of three catch plates 150. In addition, the arms 120 have each been moved to a second position in which the elastic band members 140 are stretched over and around the lip 110 of the pressure member 80, thereby applying pressure to the tofu 30 within the inner tray 20. As the pressure is applied, whey 170 is pushed out of the tofu 30, passing through the holes 70 in the inner tray to collect 180 in the outer tray 40, leaving tofu behind within the inner tray 20.

Figure 4:
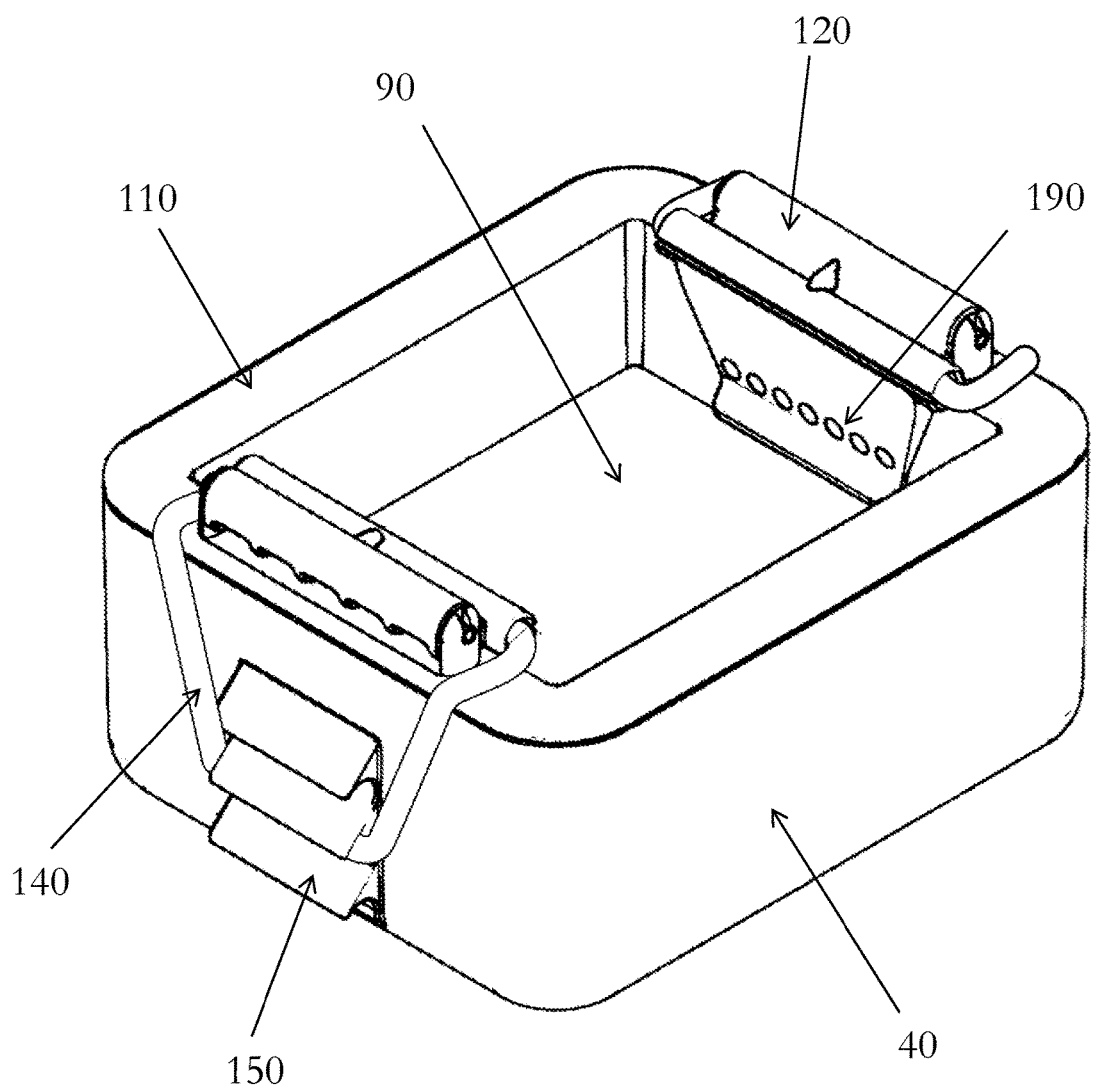
FIG. 4 is a perspective view of the tofu press of FIGS. 1 to 3, with the toggle latches coupled.

FIG. 4 is a perspective view of the tofu press 10, shown with the arms 120 in the second position of FIG. 3. The arms 120 include grips 190 for use by a user.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A tofu press, comprising:
a tray for receiving tofu therein;
a pressure member for applying pressure to the tofu within the tray; and
a toggle latch releasably coupleable between the tray and the pressure member such that pressure is applied to the tofu within the tray by the pressure member,
wherein the toggle latch comprises:
an arm pivotally connected to at least one of the tray and the pressure member;
a plurality of latch members, connected to the other of the at least one of the tray and the pressure member; and
a linkage, connected to the arm and releasably connectable to each one of the plurality of latch members in turn, to allow coupling of the tray and the pressure member with an amount of pressure determined by selection of a selected one of the plurality of latch members.

2. The tofu press of claim 1, wherein the toggle latch is configured such that:
with the arm in a first position, the linkage is releasably connectable to the latch member; and
rotational movement of the arm from the first position to a second position causes a tension in the linkage such that release from the latch member is prohibited.

3. The tofu press of claim 2, wherein the toggle latch is further configured such that rotational movement of the arm from the second position to a third position between the first and second positions causes the tension in the linkage to increase such that the linkage substantially maintains the arm in the second position.

4. The tofu press of claim 1, wherein the linkage comprises an elastic material.

5. The tofu press of claim 1, wherein the linkage is pivotally connected to the arm.

6. The tofu press of claim 1, wherein the linkage is substantially flexible.

7. The tofu press of claim 1, wherein the arm is a class 2 lever.

8. The tofu press of claim 1, wherein the arm has a substantially L-shape profile.

9. The tofu press of claim 1, comprising a plurality of toggle latches.

10. The tofu press of claim 1, wherein the tray has a surface configured to permit passage of liquid therethrough.

11. The tofu press of claim 1, wherein the tray comprises an inner tray comprising the surface configured to permit passage of liquid therethrough, and an outer tray for collecting liquid having passed through the surface of the inner tray.

12. A method of removing liquid from tofu, comprising the steps of:
- providing a tofu press according to claim 1;
- placing tofu within the tray;
- placing the pressure member on the tofu within the tray;
- coupling the toggle latch between the tray and the pressure member such that pressure is applied to the tofu within the tray by the pressure member;
- removing liquid from the tray; and
- removing tofu from the tray, the tofu having a reduced liquid content in response to the pressure applied by the pressure member.

\* \* \* \* \*